Patented Jan. 4, 1938

2,104,505

UNITED STATES PATENT OFFICE 2,104,505

DYEINGS ON CELLULOSIC FIBERS

Hermann Berthold, Leverkusen-I. G.-Werk, Germany, assignor to General Aniline Works, Inc., New York, N. Y., a corporation of Delaware No Drawing. Application April 27, 1934, Serial No. 722,817. In Germany May 10, 1933

6 Claims. (Cl. 8—5)

The present invention relates to a process of preparing dyeings on natural and artificial cellulosic fibers.

In accordance with the present invention dyestuffs are produced on natural and artificial cellulosic fibers by applying to the said fibers a hydroxynaphthalene compound containing at least a hydroxy group in an α-position, the vicinal β-position to the said hydroxy group in α-position being unsubstituted, or a derivative or a substitution product of said α-hydroxynaphthalene with free vicinal β-position, together with an alkaline reacting and an oxidizing agent and developing the dyestuff by oxidation.

As suitable hydroxynaphthalene compounds there may be enumerated by way of example 1.4-dihydroxynaphthalene, 1-methoxy-4-hydroxynaphthalene, 1.5-dihydroxynaphthalene, 1.7-dihydroxynaphthalene, 1-amino-8-hydroxynaphthalene, 1.4.5.8-tetrahydroxynaphthalene, 1'-methyl-5-hydroxy-α-naphthocarbazole, 2-nitroso-1.5-dihydroxynaphthalene or the corresponding quinone-oxime (compare Journal für praktische Chemie, volume 95, page 1917), 5.8-dihydroxy-α-naphthoquinone, and the derivatives of these hydroxy compounds which are obtainable by acting upon the hydroxynaphthalene-bisulfite-addition compounds with an amine or an aminophenol.

In my new process there can be used the free hydroxy compounds as well as their soluble salts, such as the sodium, potassium and ammonium salts, and the salts with organic bases, such as with triethanolamine. Instead of the pure hydroxynaphthalene compounds there can be used mixtures thereof, for example the technical mixtures of various isomers.

Suitable oxidizing agents are, for example, alkali metal-chromates and -bichromates, alkali metal chlorates, alkali metal perborates, potassium ferric cyanide, or mixtures of different oxidizing agents. By the addition of suitable catalysts, such as vanadinic acid salts, the effect of the oxidizing agents can be increased. As further oxidizing agents there may be enumerated organic nitro compounds, such as metanitrobenzene sodium sulfonate, further phenols, naphthols and aromatic bases which have been treated with nitrous acid, such as p-nitrosophenol, nitroso-β-naphthol (sodium salt) p-nitrosodimethylaniline.

The α-hydroxynaphthalene compounds together with the alkaline reacting agents, such as caustic soda or soda, and the oxidizing agents favorably are applied to the fibers by dissolving the components in some water and printing or slop-padding the fibers in the usual manner, the developing of the dyestuff being performed, for example, by hanging in the air or by steaming, for example, in a Mather-Platt. The oxidizing agents and additions and the application to the fibers are selected in such a manner that the formation of the dyestuff only takes place on the fibers, and especially during the steaming in a Mather-Platt, whereby an optimal affinity of the dyestuff and a sufficient fastness to rubbing are achieved.

Some auxiliary agents used in the manufacture of the slop-padding liquors and printing colors advantageously can be added to the hydroxynaphthalenes used according to the invention prior to the manufacture of the slop-padding liquors and printing colors. Thus are obtainable preparations fast to freezing and suitable to be stored by pasting the α-hydroxynaphthalene compounds with some water and a water-soluble alcohol, such as glycerine, ethyleneglycol, diethyleneglycol, thiodiglycol, thiodiglycerol and polyglycerine. Further there may be added m-nitrobenzene sodium sulfonate which besides its action as oxidizing agent in the developing of the dyestuff exerts a hydrotropic action, thereby favorably influencing the physical property of the preparations. If desired, also other hydrotropic agents can be added to the preparations, such as salts of other organic sulfonic acids or urea.

As alkaline reacting agents used in the manufacture of my new dyeings there may be mentioned soda, potash, caustic soda, caustic potash and ammonia; further organic bases, such as triethanolamine, which bases besides their alkaline action can be of advantage as solvents.

The dyeings prepared in accordance with my invention can be after-treated with oxidizing agents. For this purpose there can be used such metal salts which undergo a lake formation with the dyestuff, such as alkali metal chromates, whereby in some cases the shades are deepened.

The shades obtained in accordance with my new process on cellulosic fibers, such as cotton and artificial silk, range from brown to grey to black and are distinguished by good fastness properties.

The invention is illustrated by the following examples, without being limited thereto:

Example 1

1.5-dihydroxynaphthalene_____ 10 grams
Aqueous caustic soda lye of 38° Bé_____ 10 ccs.
m-nitrobenzene sodium sulfonate_____ 15 grams are dissolved in one litre of water. With this solution cotton is slop-padded threefold at 35–50° C. and dried. Thus, brown shades fast to soaping are obtained.

By after-treating with an aqueous solution of potassium bichromate and acetic acid or of salts of complex phosphotungstic molybdenum acids, the fastness properties can be improved.

Deeper brown shades are obtained when the slop-padded cotton is treated with wet steam in a Mather-Platt for 5 minutes and, if desired, after-treated with aqueous solutions of potassium bichromate acetic acid or of salts of complex phosphotungstic molybdenum acids.

Example 2

Viscose silk tissue is slop-padded threefold at 35–40° C. with a solution of 50 grams of 1.5-dihydroxynaphthalene and 25 ccs. of aqueous caustic soda lye in one litre of water. Without drying, the viscose is then slop-padded threefold with a solution of 30 grams of m-nitrobenzene sodiumsulfonate, 10 ccs. of aqueous caustic soda lye of 38° Bé. and 25 grams of calcined Glauber's salt in one litre of water. After drying, the viscose is steamed for 5 minutes in a Mather-Platt, after-treated in an aqueous solution of potassium bichromate and acetic acid, soaped and dried. Thus are obtained deep, dark brown shades.

More reddish-brown shades are obtained when instead of the second slop-padding liquor the following one is used:

| | |
|---|---|
| p-nitrosodimethylaniline | 30 grams |
| Aqueous caustic soda lye of 38° Bé. | 10 ccs. |
| Calcined Glauber's salt | 25 grams | dissolved to one litre in water.

Example 3

360 grams of 1.5-dihydroxynaphthalene are pasted with 360 grams of glycerine and 480 grams of water. A printing color consisting of

| | Percent |
|---|---|
| This preparation (which is fast to freezing and can be stored) | 26.7 |
| Potash | 6 |
| Industrial gum 1:1 | 40 |
| Water | 18.3 |
| Nitroso-β-naphthol (sodium salt) | 9.0 | yields, when printed on cotton, after steaming for 3 to 5 minutes and after-treated with an aqueous sodium bichromate-acetic acid solution a reddish-brown of good fastness properties.

By adding 9% of p-nitrosodimethylaniline instead of 9% of nitroso-β-naphthol (sodium salt) to the printing color, there are obtained black shades.

By printing viscose silk in the above-outlined manner, generally deeper shades are obtained which are distinguished by excellent evenness.

Example 4

| | Grams |
|---|---|
| 1.5-dihydroxynaphthalene | 240 |
| Glycerine | 240 |
| p-nitrosodimethylaniline | 330 |
| m-nitrobenzene sodium sulfonate | 42 | are made with water into a paste of 1333.3 grams (=18%) and ground in a ball-mill. Cotton is slop-padded with a mixture from 100 grams of this preparation and 10 ccs. of aqueous caustic soda lye of 38° Bé. threefold at 35–40° C. Then the cotton is dried, steamed for 5 minutes in a Mather-Platt and treated with a solution of 1 gram of potassium bichromate and 2 ccs. of glacial acetic acid in one litre of water for 5 minutes at 50–60° C. Black shades are thus obtained.

Example 5

| | Percent |
|---|---|
| 1.4-dihydroxynaphthalene | 8 |
| Potash | 6 |
| Glycerine | 4 |
| Meta-nitrobenzene sodium sulfonate | 8 |
| Water | 24 |
| Industrial gum 1:1 | 50 | are made into a printing color in the usual manner. Cotton treated with this printing color as described in Example 3 is dyed brown shades.

Example 6

By substituting the 1.4-dihydroxynaphthalene employed in Example 5 by 1.8-dihydroxynaphthalene, there are obtained grey shades, while 1.7-dihydroxynaphthalene yields a powerful blackish-grey fast to soaping.

Example 7

By substituting the 1.4-dihydroxynaphthalene employed in Example 5 by 8-amino-1-hydroxynaphthalene or the hydrochloride thereof, there are obtained deep brownish-black shades.

Example 8

By substituting the 1.4-dihydroxynaphthalene employed in Example 5 by 1'-methyl-5-hydroxy-α-naphtho-carbazole, there are obtained brown shades fast to chlorine and boiling.

Example 9

| | Grams |
|---|---|
| 1.5-dihydroxynaphthalene | 24 |
| Naphthazarine having the formula | 16 |

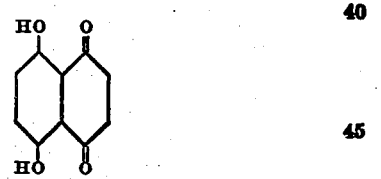

| | |
|---|---|
| m-nitrobenzene sodium sulfonate | 20 |
| Dynamite glycerine | 40 | are made into a paste of 200 grams with water, and finely ground in a ball-mill. The paste thus obtained is very stable, does not deposit or dry up, does not form crusts and can be applied for printing purposes even after prolonged storing.

With a printing color prepared from this preparation containing, for example,

| | Percent |
|---|---|
| The preparation | 35 |
| Ammonia water of 25% strength | 5 |
| Potash | 6 |
| Industrial gum 1:1 | 50 |
| Water | 4 | cotton is printed in the usual manner. Instead of the industrial gum other thickeners can be used, such as Senegal gum, tragacanth, starch or British gum. After drying, the print is steamed in a Mather-Platt and after-treated with an aqueous sodium bichromate-acetic acid solution. Instead of the bichromate-acetic acid solution there can also be used aqueous solutions of copper sulfate-acetic acid or of bichromate-copper sulfate-acetic acid. Thus are obtained full black shades fast to soaping, light and rubbing, and the tenacity of the fibres has not unfavorably been influenced.

In the claims by the term "$\alpha$-hydroxynaphthalene compound" I mean the free naphthols, their watersoluble salts and the derivatives which are obtainable by acting upon their bisulfite-addition compounds with an amine or aminophenol.

I claim:

1. The process which comprises applying to cellulosic fibers an $\alpha$-hydroxynaphthalene compound with a free vicinal $\beta$-position together with an alkaline reacting and an oxidizing agent and developing the dyestuff by oxidation.

2. Process as claimed in claim 1, in which the fibers are after-treated with an oxidizing agent.

3. Process as claimed in claim 1, in which the fibers are after-treated with an oxidizing agent undergoing a lake formation with the dyestuff.

4. The process which comprises slop-padding or printing cellulosic fibers with an aqueous solution comprising an $\alpha$-hydroxynaphthalene compound with a free vicinal $\beta$-position, an alkaline reacting agent and an oxidizing agent, drying and steaming the fibers.

5. Process as claimed in claim 4, in which the fibers are after-treated with an oxidizing agent.

6. Process as claimed in claim 4, in which the fibers are after-treated with an oxidizing agent undergoing a lake formation with the dyestuff.

HERMANN BERTHOLD.